US005515494A

United States Patent [19]

Lentz

[11] Patent Number: 5,515,494

[45] Date of Patent: May 7, 1996

[54] GRAPHICS CONTROL PLANES FOR WINDOWING AND OTHER DISPLAY OPERATIONS

[75] Inventor: Derek J. Lentz, Los Gatos, Calif.

[73] Assignee: Seiko Epson Corporation, Tokyo, Japan

[21] Appl. No.: 366,423

[22] Filed: Dec. 29, 1994

Related U.S. Application Data

[63] Continuation of Ser. No. 993,736, Dec. 17, 1992, abandoned.

[51] Int. Cl.$^6$ .......... G06F 3/00

[52] U.S. Cl. .......... 395/157; 395/158

[58] Field of Search .......... 395/157, 158, 395/161; 345/118, 119, 120

[56] References Cited

U.S. PATENT DOCUMENTS

| | | | |
|---|---|---|---|
| 4,550,315 | 10/1985 | Bass et al. | 340/703 |
| 4,555,775 | 11/1985 | Pike | 395/158 |
| 4,710,767 | 12/1987 | Sciacero et al. | 340/799 |
| 4,769,636 | 9/1988 | Iwami et al. | 345/120 |
| 4,769,762 | 9/1988 | Tsujido | 364/521 |
| 4,772,881 | 9/1988 | Hannah | 340/703 |
| 4,779,081 | 10/1988 | Nakayama et al. | 340/721 |
| 4,780,709 | 10/1988 | Randall | 340/721 |
| 4,783,648 | 11/1988 | Homma et al. | 340/724 |
| 4,790,025 | 12/1988 | Inoue et al. | 382/41 |
| 4,806,919 | 2/1989 | Nakayama et al. | 340/721 |
| 4,823,108 | 4/1989 | Pope | 340/721 |
| 4,860,218 | 8/1989 | Sleator | 364/518 |
| 4,862,154 | 8/1989 | Gonzalez-Lopez | 340/747 |
| 4,954,818 | 9/1990 | Nakane et al. | 345/120 |
| 4,954,819 | 9/1990 | Watkins | 340/721 |
| 5,003,496 | 3/1991 | Hunt, Jr. et al. | 364/521 |
| 5,043,923 | 8/1991 | Joy et al. | 364/522 |
| 5,061,919 | 10/1991 | Watkins | 345/115 |
| 5,091,717 | 2/1992 | Carrie et al. | 340/703 |
| 5,101,365 | 3/1992 | Westberg et al. | 395/158 |
| 5,216,413 | 6/1993 | Seiler et al. | 345/120 |
| 5,276,437 | 1/1994 | Horvath et al. | 345/118 |

FOREIGN PATENT DOCUMENTS

| | | |
|---|---|---|
| 0396377A2 | 7/1990 | European Pat. Off. . |
| 0419814A2 | 3/1991 | European Pat. Off. . |
| 2226938A | 11/1990 | United Kingdom . |

*Primary Examiner*—Heather R. Herndon
*Assistant Examiner*—Cliff N. Vo
*Attorney, Agent, or Firm*—Sterne, Kessler, Goldstein & Fox

[57] ABSTRACT

The present invention is a system and method for controlling pixel display and update in a computer graphics system for displaying multiple windows. The apparatus comprises a frame buffer for storing a pixel data to be displayed. The frame buffer comprises a write-enable plane configured to indicate whether a pixel is within a visible portion of an active window. The apparatus comprises memory for storing a window data structure that includes data regarding window priorities, window boundaries and window intersections for managing the write-enable plane efficiently. A graphics server determines whether a pixel is to be written to the frame buffer, wherein the determination is made based on the write-enable phase and window clip boundaries. Additional planes are optionally provided to allow selection of a front and back frame buffer and to select between video modes. Additionally, a write once plane can be provided to indicate whether a pixel is to be written only once per object.

19 Claims, 10 Drawing Sheets

CONVENTIONAL GRAPHICS SYSTEM

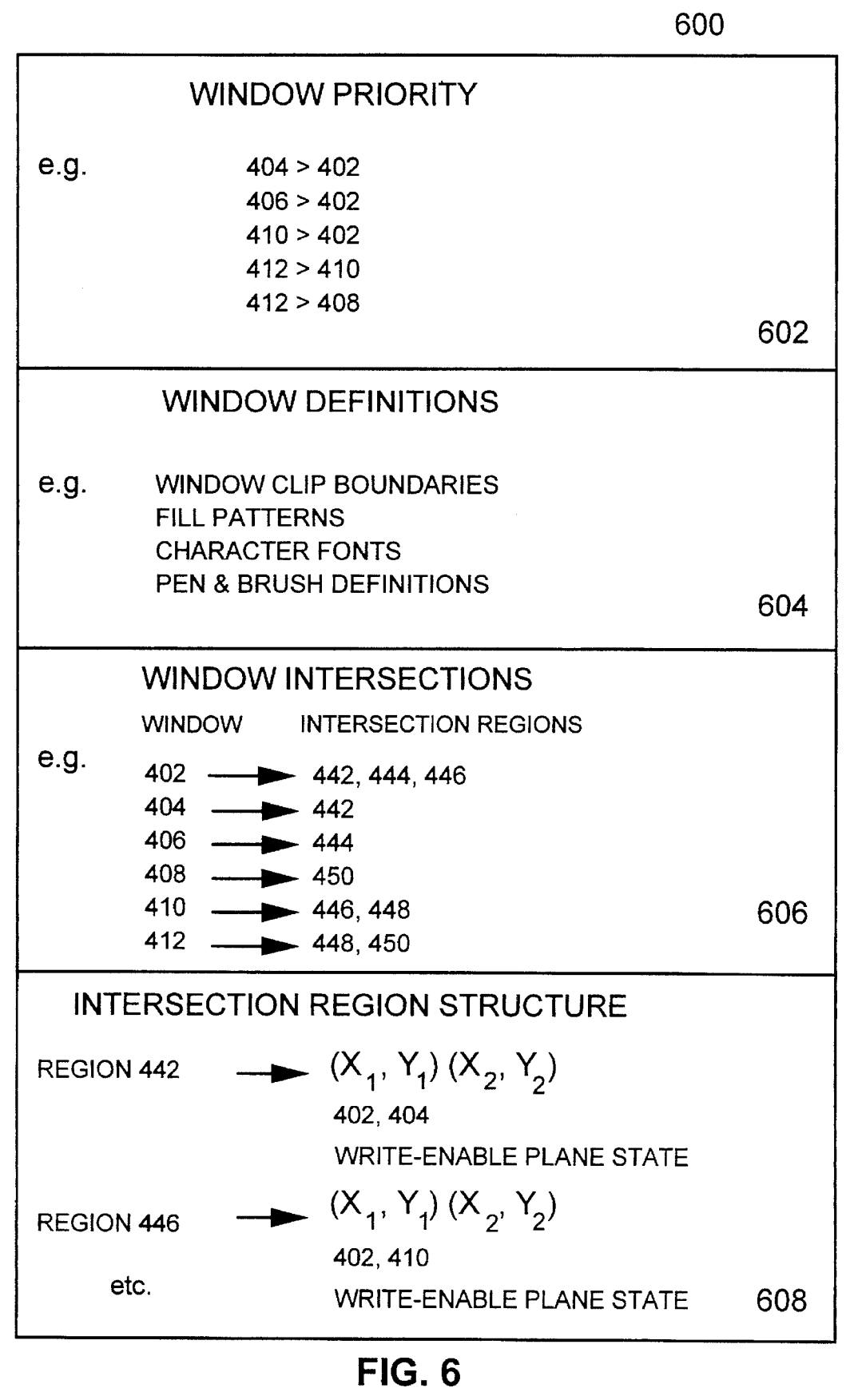

600

WINDOW PRIORITY e.g.

404 > 402
406 > 402
410 > 402
412 > 410
412 > 408

602

WINDOW DEFINITIONS e.g.

WINDOW CLIP BOUNDARIES
FILL PATTERNS
CHARACTER FONTS
PEN & BRUSH DEFINITIONS

604

WINDOW INTERSECTIONS e.g.

| WINDOW | INTERSECTION REGIONS |
|---|---|
| 402 → | 442, 444, 446 |
| 404 → | 442 |
| 406 → | 444 |
| 408 → | 450 |
| 410 → | 446, 448 |
| 412 → | 448, 450 |

606

INTERSECTION REGION STRUCTURE

REGION 442 → $(X_1, Y_1)\ (X_2, Y_2)$
402, 404
WRITE-ENABLE PLANE STATE

REGION 446 → $(X_1, Y_1)\ (X_2, Y_2)$
402, 410
WRITE-ENABLE PLANE STATE etc.

608

FIG. 6

GRAPHICS CONTROL PLANES FOR WINDOWING AND OTHER DISPLAY OPERATIONS

This application is a continuation of application Ser. No. 07/993,736, filed Dec. 17, 1992, now abandoned.

BACKGROUND OF THE INVENTION

1. Field of the Invention

The present invention relates generally to raster graphics systems, and more particularly to a system and method for controlling the drawing of windows in a system for displaying multiple windows.

2. Related Art

Computer graphics techniques enjoy widespread use in contemporary computing systems. In computing systems spanning the spectrum of computing power from personal computers (PCs) to workstations to dedicated graphics systems, raster graphics techniques have become the dominant mechanism for displaying graphic images.

In a raster graphics system, horizontal display lines, called raster lines, are represented by a row of picture elements (pixels or PELs). An entire image is formed by combining a set of raster lines into a rectangular array of lines called a raster. Thus the raster, which is used to hold one or more images, comprises a matrix of pixels. This matrix of pixels is stored as digital information in a memory buffer. When the memory buffer is specifically designed to hold data that is to be transmitted to a display device, the memory buffer is referred to as a "frame buffer."

In a monochrome system, each pixel is typically represented by a single bit in the frame buffer. The state of the bit (i.e., 1 or 0) determines whether the corresponding pixel is-on or off (i.e., light or dark on the display). In such a system, the memory buffer is referred to as a bitmap.

In systems designed to hold more complex images such as color and 3D images, each pixel is represented by a plurality of bits that contain information regarding that pixel. Included in the bits that represent each pixel are bits for storing color information, bits for storing depth information, and the like. The entire matrix of bits in the memory buffer in a multiple-bit-per-pixel system is referred to as a pixmap.

To display the image, the bits in the pixmap are typically scanned out of the frame buffer in a sequential order one raster line at a time. The data that is scanned out is transmitted to a display device (most commonly a CRT video monitor). Display devices other than CRT monitors have different, although usually somewhat similar, scanning and display requirements.

As system capabilities have been improved to provide enhanced graphics, system complexity has increased as well. For example, contemporary graphics systems provide greater resolution (more pixels per unit area) and a larger selection of colors. Both of these enhancements require a larger number of bits to make up the pixmap.

As the cost of memory has gone down, systems have been provided with increased capabilities for a given cost target. With low cost random access memories (RAMs) now available and special-purpose video RAMs (VRAMs), large, high-speed frame buffers are becoming more commonplace for displaying 3D graphics.

3D raster graphics systems use a technique known as "double buffering." In double buffering, while an image is displayed from one frame buffer, a second frame buffer is cleared of all data and rewritten with a new image for a subsequent view.

This technique allows the frame buffer to be updated while the user is viewing the previous image. This prevents the screen from flickering while the frame buffer is erased and redrawn. This technique is necessary since images usually require a significant amount of time to draw relative to the time it takes to display the image on the display device.

For a detailed discussion of raster graphics systems see the text, *Computer Graphics: Principles and Practice,* Second Edition, published 1990 by Addison-Wesley Publishing Company, Inc., by James D. Foley, Andries van Dam, Steven K. Feiner, and John F. Hughes; specifically, see Chapters 1, 4.3, and 18.

Another area of increasing popularity in the contemporary computer market is that of "windowing." Windowing capabilities on PCs, and workstations are commonplace. In fact, windows are integral components in a graphics user interface such as Microsoft Windows™, the X Windows System™ and in numerous applications for Apple Macintosh™ computers.

A requirement to combine raster graphics techniques with a windows environment is a natural outgrowth of the evolution of these two technologies. Such a combination, however, presents numerous challenges. One challenge in particular is to switch between images in a double buffer while displaying animated images on a display screen.

In dynamic frame buffers it is easy to swap and clear an entire buffer quickly, thus changing the contents of the entire display area. However, for a windowed screen where only a portion of the display is to be updated, problems arise. Only a subset of the screen is typically allocated to a specific window at a given time. Because any given window can use either buffer in a double buffered frame buffer, the buffer selected by each window must be independently controlled.

Also, at any time, the foreground buffer (i.e., the buffer for display) must be selected individually for each window. But, since windows may start and end on any pixel in the display, this selection must be done for each pixel at display time.

Conventional graphics systems use window ID's (WIDs) to control drawing into windows. Before defining WIDs, it will be useful to define the term "plane" as it is used in frame buffer applications. A plane is a subset of the pixmap comprising the same bit in all pixels. A plane is a "horizontal" cross-section of the pixmap. Thus, the set consisting of the first bit in each pixel, for example, makes up a plane.

In a system employing WIDs, additional planes are included in the frame buffer memory. The additional planes hold a code, called a WID. The WID code identifies the window to which a pixel belongs. When the pixel is sent to the frame buffer, its WID code is compared to the WID identifying the window to be displayed at that location on the screen. If the comparison agrees, a write enable signal is generated and the pixel is saved in the frame buffer. If the WIDs do not compare, no write enable signal is generated and that pixel is not written to the frame buffer.

For systems using multiple frame buffers, WIDs are used to control the frame buffer to which pixel dam is written.

For a further discussion of WIDs see: U.S. Pat. No. 4,769,762 to Tsujido; U.S. Pat. No. 5,101,365 to Westberg, et al.; and U.S. Pat. No. 5,091,717 to Carrie, et al.

WID systems do have disadvantages. First, WID systems require extra circuitry for decoding the WID codes in the data and in the address and for determining if they coincide.

Second, since the size of the WID is limited, this technique only allows management of a limited number of windows unless complicated "WID swapping" software is used. Many windows are required by some common Window systems. For example a three-bit WID only provides 8 unique WIDs. Third, numerous planes are required to implement WIDs in a complex system because the more windows the system has the more WID planes are required. For example, 8 WID planes are required for a 256-window system. This equates to 8 bits per pixel. In a 1k by 2k frame buffer, 16Mbits are required to support the 8 WID planes.

SUMMARY OF THE INVENTION

The present invention provides a system and method for writing to a display device in a graphic system capable of supporting multiple windows. The present invention provides a set of planes called graphics control planes used to control video features in the graphics system. A front/back buffer select plane is used to select whether a pixel belongs to a front buffer or a back buffer of a dual buffer system. A video mode select plane indicates which of multiple pixel formats is selected. For example, a video mode select plane can be used to select 12-bit or 24-bit RGB pixels. Additional video mode select planes can be added to provide additional flexibility such as support for alternative video modes. One example of an alternative mode is an 8-plane color index mode.

A write enable plane is one key feature that allows rectangular and non-rectangular window shapes to be supported by the graphics system. The write enable plane keeps track of whether a pixel exists in a window, and more specifically, whether the pixel exists in a part of the window that is to be displayed.

Additionally, a write once plane may be included to support a system requirement that pixels only be written once per object. This requirement only exists in certain environments such as the X Windows environment.

Using graphics control planes, and more specifically, using the write enable plane, provides hardware savings over conventional techniques for drawing to windows. The write enable plane provides great flexibility to windowing systems at a cost of only one plane of frame buffer memory.

To support the write enable plane, a window data structure is established to define imported window parameters. The window data structure includes relative window priorities (i.e., whether a window is on top of or below another window), window definitions such as window clip boundaries, fill patterns and brush definitions. The window data structure also includes window intersection information that defines intersection regions where one window overlaps with at least one other window. An intersection region data structure defines the intersection region between windows, its coordinates and the windows overlapped to form the intersection region.

The system uses the data structure to determine whether a window in which an object to be drawn is completely obscured, partially obscured or totally unobscured by another window. If it is totally obscured, the drawing operation ends and all pixels for that window may be discarded. If totally unobscured, the pixels are drawn into-the window using window clip boundary information.

If the window is partially obscured by another window, the system determines whether the window definition changed since the last operation. If so, the write enable plane is updated so that it indicates which portions of the window are now unobscured. If the window definition has not changed, the write enable plane does not have to be updated. The system next uses window clip boundaries in conjunction with the write enable plane to determine whether each pixel is to be written to the frame buffer for that window.

A feature of the invention is that the determination whether the pixel is to be written to the frame buffer can be made by using a single write enable plane. This is a great savings over conventional window ID (WID) systems that require n planes to implement $2^n$ windows and additional hardware to interpret the n planes.

An additional feature of the invention is that if the window definition does not change, the write control plane does not have to be updated between operations. This is because obscured and unobscured regions can be defined for windows in a complementary fashion. In this case, the only thing that changes is the hardware test selected to determine whether to write the pixel to the frame buffer. This results in a savings because the write enable plane does not have to be rewritten.

A further advantage is that the write enable plane is easily used to support windowing applications that utilize non-rectangular windows.

Further features and advantages of the present invention, as well as the structure and operation of various embodiments of the present invention, are described in detail below with reference to the accompanying drawings.

BRIEF DESCRIPTION OF THE DRAWINGS

The present invention will be described with reference to the accompanying drawings. In the drawings, like reference numbers indicate identical or functionally similar elements. Additionally, the left-most digit of a reference number identifies the drawing in which the reference number first appears.

FIG. 6 is a diagram illustrating a dam structure used to support the write enable plane of the present invention.

DETAILED DESCRIPTION OF THE INVENTION

Figure 1:
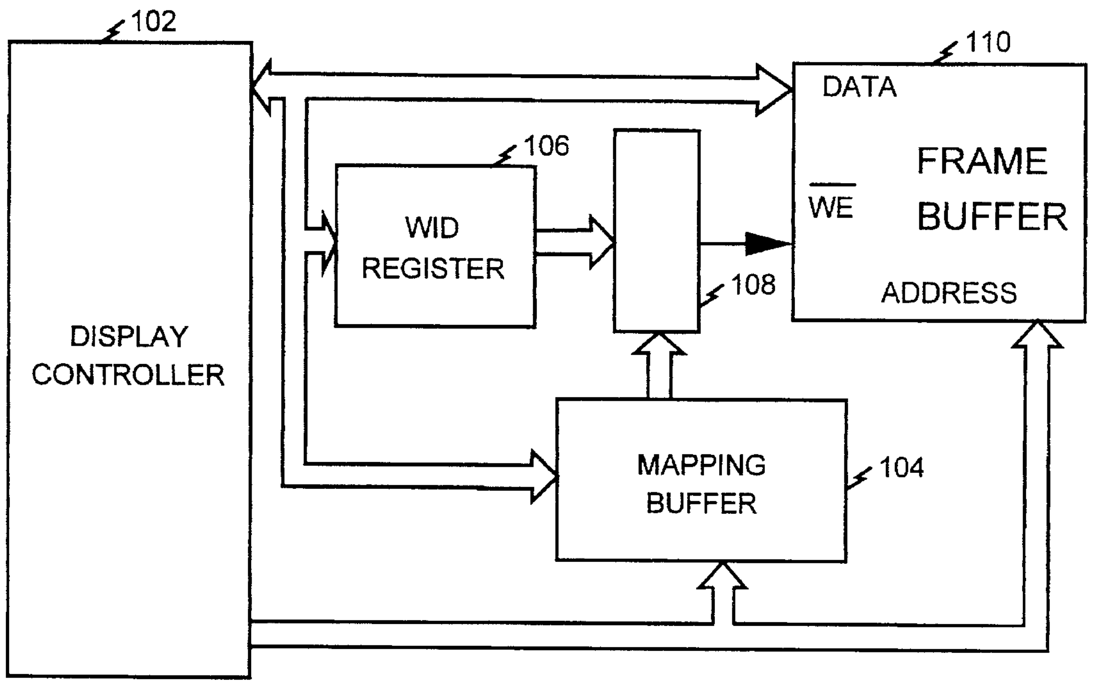
FIG. 1 a block diagram illustrating a conventional graphics system using window IDs.

The present invention is directed to a system and method for writing data to a display in a graphics system capable of supporting multiple windows. Graphics control planes are provided to control whether a pixel in a frame buffer or pixmap is to be modified by a given active window. According to the invention, a display controller determines whether a pixel is to be modified. This determination is based on the window to which the pixel belongs. If the window containing the pixel is active, the pixel falls in an uncovered portion of the window and it may be drawn. The present invention provides a means by which the drawing hardware can limit drawing to the active window.

The invention as discussed in terms of operation in conjunction with a frame buffer. It will be obvious to one of ordinary skill in the art that operation with a pixmap is the same as with the frame buffer.

Every pixel in the frame buffer or pixmap includes a bit of the write control plane which is a "write enable bit." The write control bit is used to determine if the current pixel may be drawn by the currently active window. The write control bits can be enabled to or disabled from limiting drawing (clip or scissor) and the value that enables writing to the frame buffer can be programmed to be a logical one (1) or zero (0). Although not required, this programmable enable level feature allows more flexibility and more efficient control of drawing with multiple windows. How this is achieved is discussed below.

Figure 4:
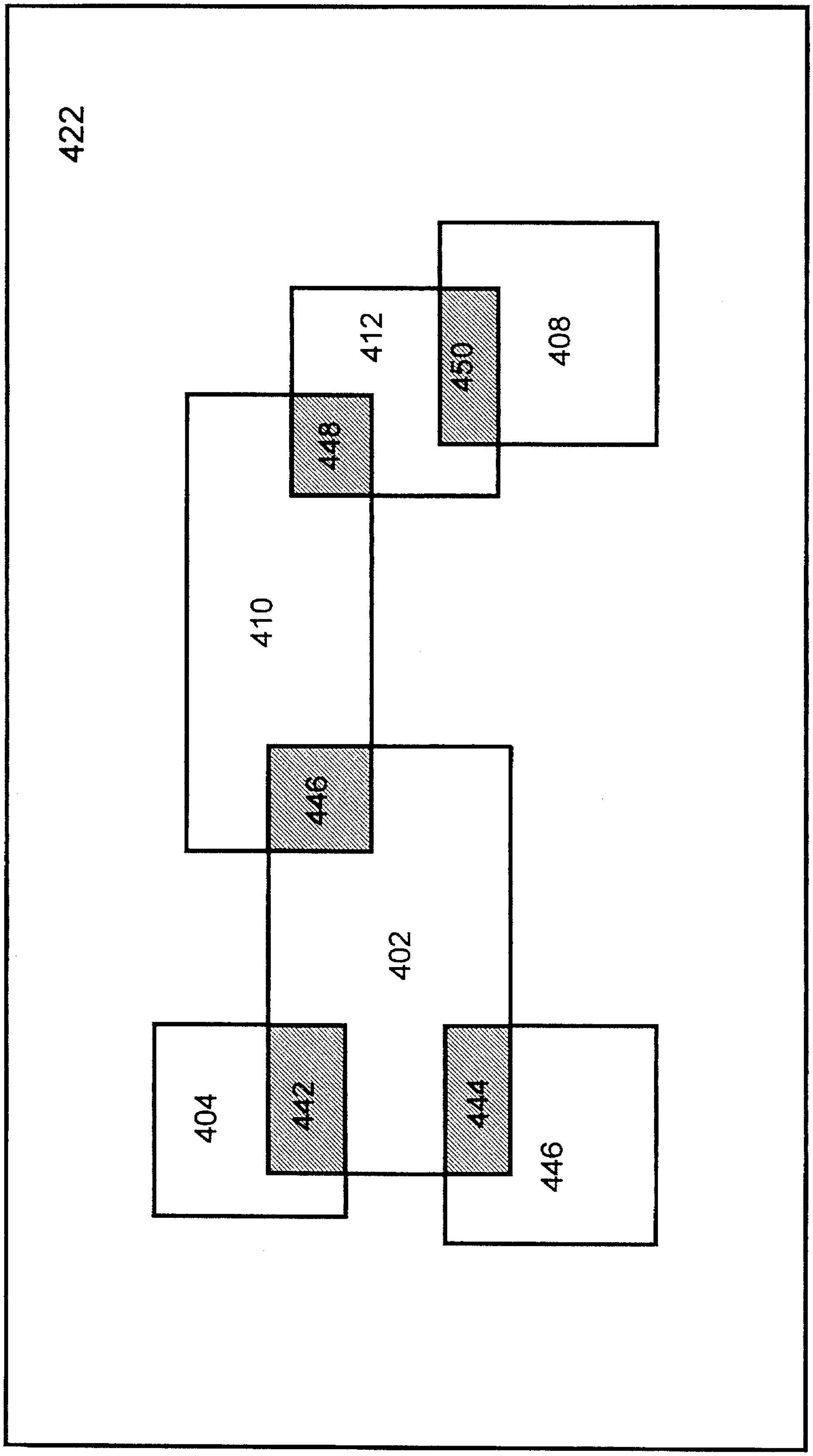
FIG. 4 is a diagram illustrating an example of multiple windows overlapping one another on a display screen.

FIG. 4 is a diagram illustrating the use of multiple windows in a display screen. Display screen 422 displays graphics information from multiple windows 402, 404, 406, 408, 410, 412. These windows 402, 404, 406, 408, 410, 412 can be arranged on display screen 422 such that they obscure or partially obscure one another. For example window 402 is partially obscured by window 410, while window 410 is partially obscured by window 412. Thus it is important to determine whether a pixel is to be displayed, or whether it is part of an inactive window or a masked portion of an active window.

WIDs, introduced above, are additional planes included to store a code identifying a particular window to which each pixel belongs. FIG. 1 is a block diagram illustrating a conventional system implementing WIDs. Referring to FIG. 1 WIDs will now be described in more detail. In operation, windows are selected by a display controller 102 (or a graphics server in an X-windows system). Display controller 102 usually includes a central processing unit (CPU). Display controller 102 creates a window map and stores this map in a window mapping buffer 104.

The window map defines particular areas of the display to be utilized for individual windows. The window map is generated based on values provided by display controller 102. These values include both a pixel address and a WID for each pixel to be included in each window. The WID is written to each corresponding position of the particular window in window mapping buffer 104. When a window is written to window mapping buffer 104, each position defining that window within a WID memory stores the WID for that window. When a second window that lies in front of the first window is written to window mapping buffer 104, the window number for the second window is stored at each position representing the second window. In this manner, portions of the second window that overlay the first window are written on top of those overlapping positions of the first window in window mapping buffer 104. As a result, these portions of the second window automatically cover and clip the first window. After all of the windows to be displayed have been written, window mapping buffer 104 contains a map indicating which windows are to be displayed at each location on the display. In other words, window mapping buffer 104 contains a window ID for each pixel of the display indicating which window is to be displayed at that pixel.

The windows actually need not be written in a given order. There is usually a priority in the window system software indicating which windows are on top of which other windows. This priority may be determined independently from the order in which the windows are created.

To write information to a display memory, the WID for each pixel of the frame buffer is stored in a WID register 106 and compared to the WID in window mapping buffer 104 for that pixel location. If the WID in window mapping buffer 104 is the same as the WID for the pixel to be displayed, a comparator circuit 108 causes write enable logic to allow the pixel information to be written to a frame buffer 110 at the correct pixel address. If, on the other hand, comparator circuitry 108 determines that the WID for the pixel is not the same as the WID stored in window mapping buffer 104, then the pixel information is not written to frame buffer 110. Consequently, only those pixels of a particular location belonging to a window to be displayed at that location are written to frame buffer 110 and subsequently displayed.

Thus, using WIDs, only pixels in the foreground windows for each pixel location are written to the frame buffer.

Other systems use a variation of the above-described technique. In these systems, WIDs function as an index that indicates a location in a table where display characteristics associated with each WID will be found. As each new pixel value is generated its WID is used as an address to look up characteristics about that pixel. If the currently active window (the window currently being drawn into) matches the foreground window at the new pixel location, the new pixel value will be stored in the frame buffer for display.

WID's also provide control information for the graphics controller. This information is usually programmed in lookup tables in the hardware and indicates such things as whether the front of back buffer in the frame buffer is currently being displayed and how a CLUT (color lookup table) should interpret the contents of the color planes in the pixel.

One way to determine whether a pixel belongs to a window controlling a particular pixel location is through the use of WIDs described above. However, WIDs require additional frame buffer memory planes and controller hardware to implement unless complicated WID swapping software is used. Typically, 8 WID planes of frame buffer memory are currently required for graphics systems to have sufficient flexibility and efficiency.

Figure 8:
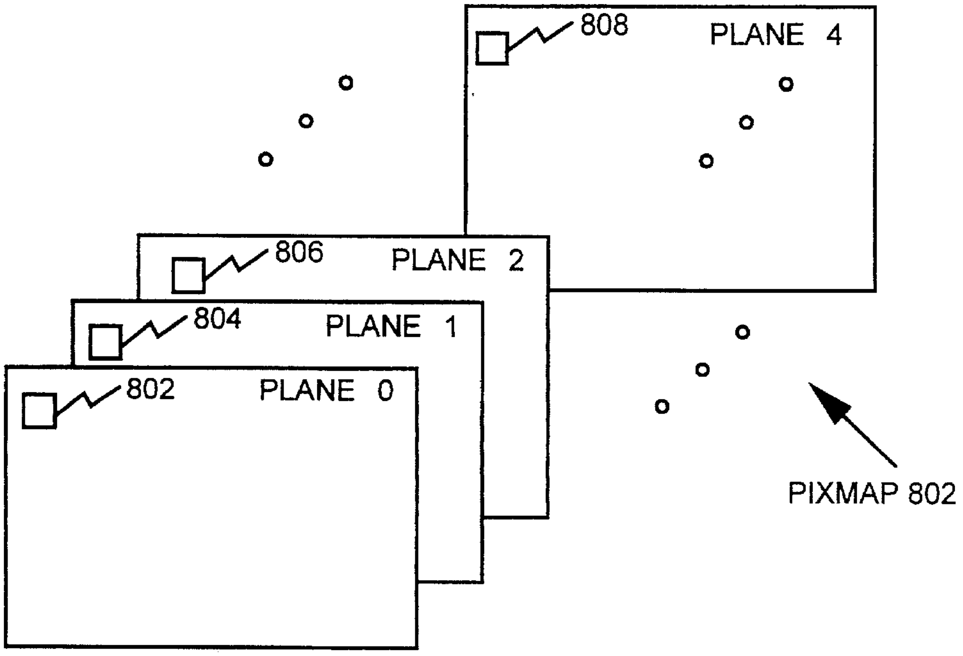
FIG. 8 is a diagram illustrating typical implementation planes in a pixmap.

FIG. 8 is a general illustration of the planes of a typical frame buffer or pixmap. Referring now to FIG. 8, a pixmap 802 is implemented using a plurality of planes (referred to as plane 0, plane 1, et cetera). Each plane 0,1,2, . . . , N is a two-dimensional matrix of bits, one per pixel, that individually, or taken in sets, comprise information regarding each pixel. A complete set of planes 0,1,2, . . . , N makes up a pixmap where each pixel is represented by N bits, one per plane.

For example, bits 802, 804, 806 and 808 exist in plane 0, plane 1, plane 2, and plane N, respectively and correspond to a single pixel. Each bit 802, 804, 806 and 808 stores information for that pixel. Every other pixel in pixmap 800 also has its own set of bits (not shown), one per plane 0, 1,2, . . . N.

The number of planes 0,1,2, . . . , N depends on the number of features provided by the graphics system. Planes are provided for color, color indexing, z-buffering, et cetera. For systems using WIDs, a sufficient number of WID planes must be provided to identify the number of windows provided by the graphics system. For example, if the graphics system can support 256 windows 8 planes must be provided so the WID hardware can support 256 windows. These additional planes add additional hardware cost to the graphics system as is illustrated below.

Figure 3:
FIG. 3 illustrates graphics control planes of the present invention.

The present invention eliminates the need for WID planes by providing an alternative set of planes, called graphics control planes. FIG. 3 is a diagram illustrating graphics control planes. In a preferred embodiment, up to 5 graphics control planes may exist in the system. These planes are not double buffered. Fewer or more graphics control planes can be implemented depending on the graphics subsystem features desired. A system with fewer planes is less costly to implement, thus a performance/cost tradeoff is possible.

Graphics control planes are a subset of the planes in a frame buffer (or a pixmap) and are used to control video features in a graphics system. Although the use of planes (e.g., RGB planes) is known in the art, the use of graphics control planes as taught in the present invention provides many new and useful features.

Figure 2:
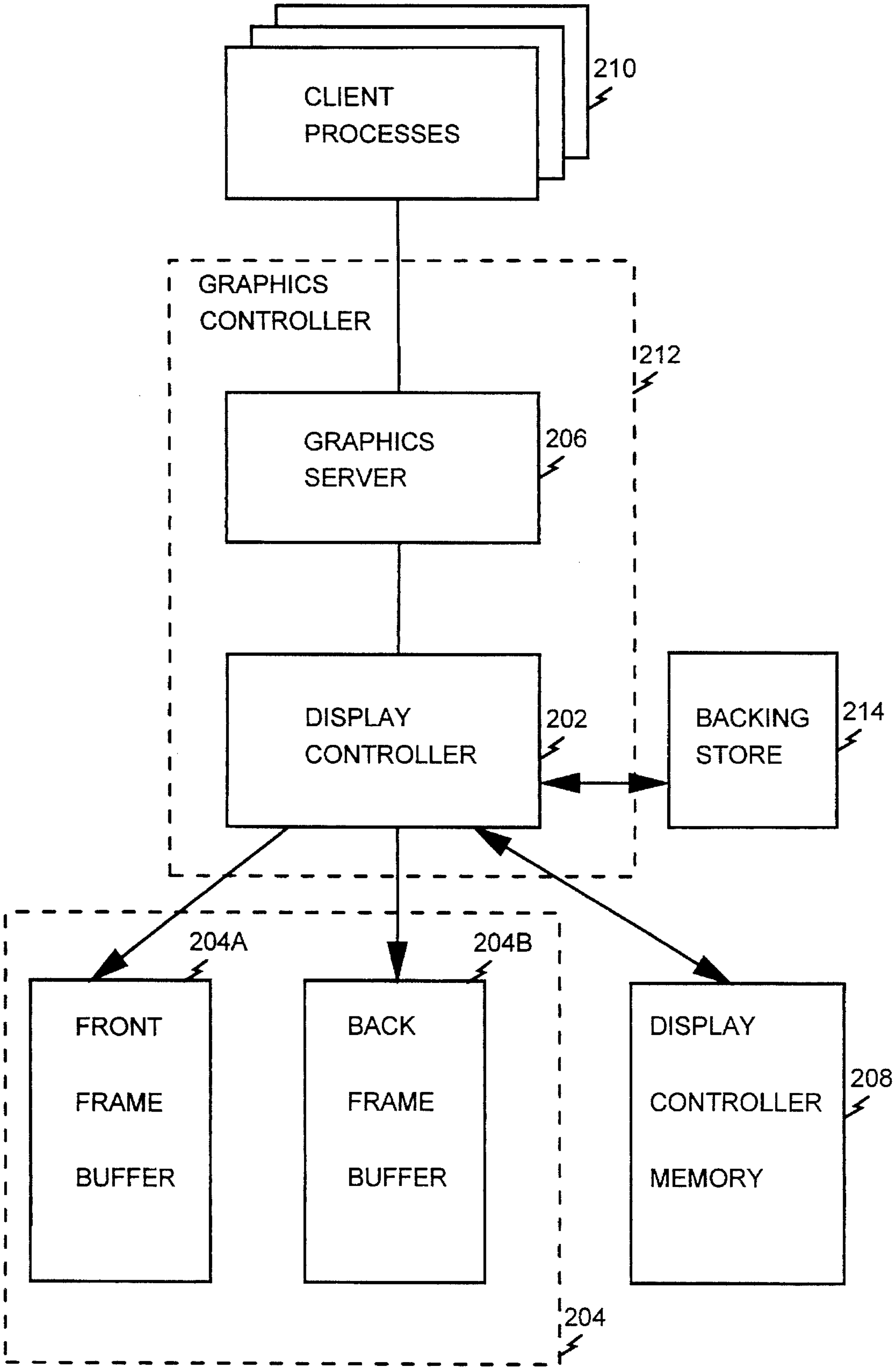
FIG. 2 is a block diagram illustrating a system used to support graphics control planes according to the present invention.

The hardware required to implement control planes is illustrated in FIG. 2. Referring to FIG. 2, a graphics controller 212 uses a data structure (described below with reference to FIG. 6) to determine whether a pixel should be written to a frame buffer 204. Graphics controller 212 comprises a graphics server 206 and a display controller 202. Graphics server (or graphics software driver) 206, which is part of the window system software, is provided to manage tasks for multiple client processes 210. The assignment of functionality between graphics server 206 and display controller 202 is made based on system requirements and standard design practices. Additionally, display controller memory 208 is provided for use by display controller 202. In one embodiment, 2 buffers are provided in frame buffer 204, a front buffer 204A and a back buffer 204B.

A backing store 214 can optionally be used to temporarily store pixels of obscured portions of windows. These pixels can be recalled for later display operations.

Referring now to FIG. 3, a plane 322 serves as a front/back buffer select plane, for double buffered systems. Buffer select plane 322 is used to select whether the pixel belongs to a front buffer 204A or a back buffer 204B of a dual buffer system.

If multiple pixel formats are supported in the frame buffer, a video mode select plane 324 is provided to indicate a video mode. Video modes define the format of pixels in frame buffer 204 for controlling the display of pixels on the system monitor. For example, video mode select plane 324 may indicate whether the pixel provides 12-bits or 24-bits of RGB. A second video mode select plane 326 may be provided to add additional video modes such as an 8 plane color index mode. Thus, a plurality of interpretations of the contents of the pixel in the frame buffer may be implemented with a small number of planes.

A write-enable plane 328 allows complex (non-rectangular) window shapes to be supported by the graphics system. Write enable plane 328 is provided to keep track of whether the pixel exists in a window, or more specifically, a part of a window that is to be displayed.

A write-once plane 330 may be included to support the X-windows requirement that pixels only be written once per object. When a bit in write-once plane 330 is set true, the pixel corresponding to that bit is only written once per object.

Table 1 illustrates the savings that can be obtained by using graphics control planes (GCPs) in place of WIDs. This savings is illustrated in terms of two types of systems: a high-end system and a low-end system. For high-end systems, both techniques (WIDs and GCPs) use 24 color planes (8 planes each for red, green and blue), 24 Z-buffer planes (256 levels for 3-dimensional graphics), 8 overlay planes, and 4 stencil planes. The savings of the GCP system of the present invention is realized in that the WID system requires 8 planes to support 256 windows while the present invention only requires 4 planes (GCPs) to provide windowing and the other graphics functionality described above with reference to FIG. 3. Note that not all of the functionality provided by GCPs is needed and thus additional savings can be had by not using all of the GCPs. The example in table 1 illustrates a system with only one video mode select plane 326. For a system with a display that is 1280 pixels by 1024 pixels the frame buffer is typically 2Mbits/plane. This equates to 0.25Mbytes/plane for an 8 bit/byte system. Thus the WID system requires 17MBytes of frame buffer memory while the GCP system only requires 16MBytes.

TABLE 1

| | |
|---|---|
| **High-End System** | |
| WIDS | |
| Color Planes | 24 |
| Z-Buffer Planes | 24 |
| Overlay Planes | 8 |
| WID Planes | 8 |
| Stencil Planes | 4 |
| Total Planes | 68 |
| MBytes | 17 |
| Graphics Control Planes | |
| Color Planes | 24 |
| Z-Buffer Planes | 24 |
| Overlay Planes | 8 |
| GCP | 4 |
| Stencil Planes | 4 |
| Total Planes | 64 |
| MBytes | 16 |
| **Low-End System** | |
| WIDS | |
| Color Planes | 8 |
| WID Planes | 8 |
| Total Planes | 16 |
| MBytes | 4 |
| Graphics Control Planes | |
| Color Planes | 8 |
| GCP | 2 |
| Total Planes | 10 |
| MBytes | 2.5 |

For the low-end system the savings are more dramatic. Both low-end systems use 8 color planes, but the WID system still requires 8 WID planes to control 256 windows. The GCP system only requires 2 planes to control the video features. These are the write-enable plane 328 for controlling the drawing of pixels into the frame buffer and the write once plane 330 for meeting X-windows requirements. Note in a system other than an X-window system, the write-once plane may be eliminated, thus saving another 0.25MByte of memory.

The use of graphics control planes, and more specifically, the use of write-enable plane 328 provides great flexibility to windowing systems at a cost of only 1 plane of frame buffer memory.

The following discussion illustrates the flexibility provided by write enable plane 328 in the present invention. Write enable plane 328 is best used in conjunction with one or more rectangular clipping boundary compare circuits, as described below.

Five window control cases can arise in windowing systems. Each case can be controlled using the present invention. These cases are as follows:

1. Draw a first rectangular window with no other window obscuring any part of the first window. Examples are window 404, 406, 408 and 412.

2. Draw a first rectangular window that is partially obscured by other windows, but the other windows are not themselves obscured. An example of this is window 414 which is partially obscured by window 408, yet window 408 is not obscured by any other window.

3. Draw a first rectangular window that is partially obscured by other windows that may also be partially obscured. An Example is window 402 which is partially obscured by window 410 while window 410 itself is partially obscured by window 412.

4. Draw a non-rectangular (e.g. round) window with or without obscuration.

5. A first window is totally obscured by another overlapping window.

To handle these cases, a window data structure is established to define important window parameters. The exact configuration chosen for the window data structure is not important as long as it is sufficient to determine window overlap and optionally, the state of write-enable plane 328. FIG. 6 illustrates an example of a window data structure 600 used by display controller 202 to draw in windows. Referring to FIG. 6, a window priority data structure 602 is provided to list the relative priority of each window (i.e., whether a window is on top of or below another window). For the example shown by the screen configuration of FIG. 4, window priority data structure 602 lists window 404 as having a higher priority than window 402. This means that window 404 is "on top of" window 402 and at an intersection region 442 of window 402 and window 404 (where they both exist) window 404 is displayed and window 402 is obscured. Window priority dam structure 602 maintains a similar list for all windows in the display area. The exact implementation of window priority data structure 602 depends on the requirements of the specific window system controlling the display.

A window definitions data structure 604 is provided that defines key parameters for each window defined by the window system. Definitions include window clip boundaries 500, fill patterns, character fonts, and pen and brush definitions for each window, and the like.

Figure 5:
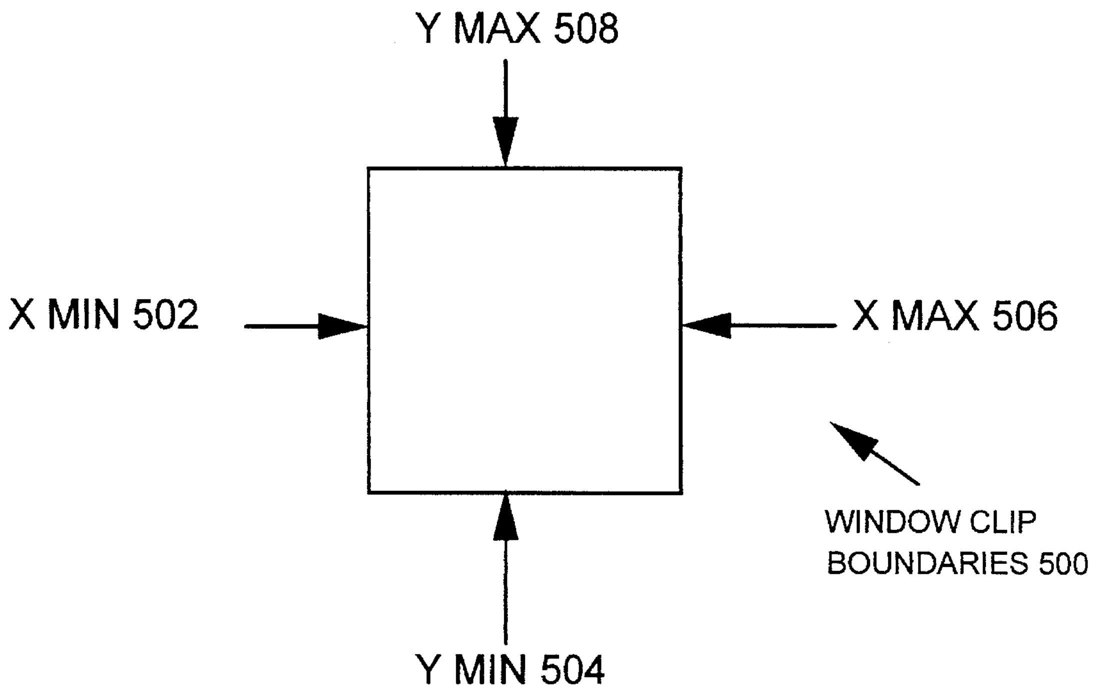
FIG. 5 is a diagram illustrating window clip boundaries of the present invention.

FIG. 5 illustrates window clip boundaries 500. Window clip boundaries 500 define the boundaries for each window in terms of the two dimensions of the display screen. Defined are an X-min 502, a Y-min 504, an X-max 506 and a Y-max 508 boundary. These boundaries could be listed in window definitions data structure 604 as a pair of coordinates $(X_1, Y_1)$ and $(X_2, Y_2)$, where $X_1$ is X-min 502, $Y_1$ is Y-min 504, $X_2$ is X-max 506, and $Y_2$ is Y-max 508. Alternatively, other conventional methods of description may be used. Window clip boundaries 500 could also be used to define a subset of a window.

A window intersections data structure 606 defines intersection regions for each window defined by the display controller. An intersection region is defined as a region where one window overlaps with at least one other window. Intersection regions are computed using window clip boundaries 500. As an example, intersection region 442 is the region where window 402 overlaps with window 404. FIG. 6 illustrates window intersections data structure 606 structured such that window intersections are listed for each window.

Intersection region data structure 608 defines the intersection region, its coordinates and the windows that overlap to form the intersection region. For example, intersection region 442 is defined by the coordinates $(X_1, Y_1)$ for window 402 and $(X_2, Y_2)$ for window 404. Intersection region data structure 608 also includes the state of the write-enable plane in each intersection region.

Figure 7:
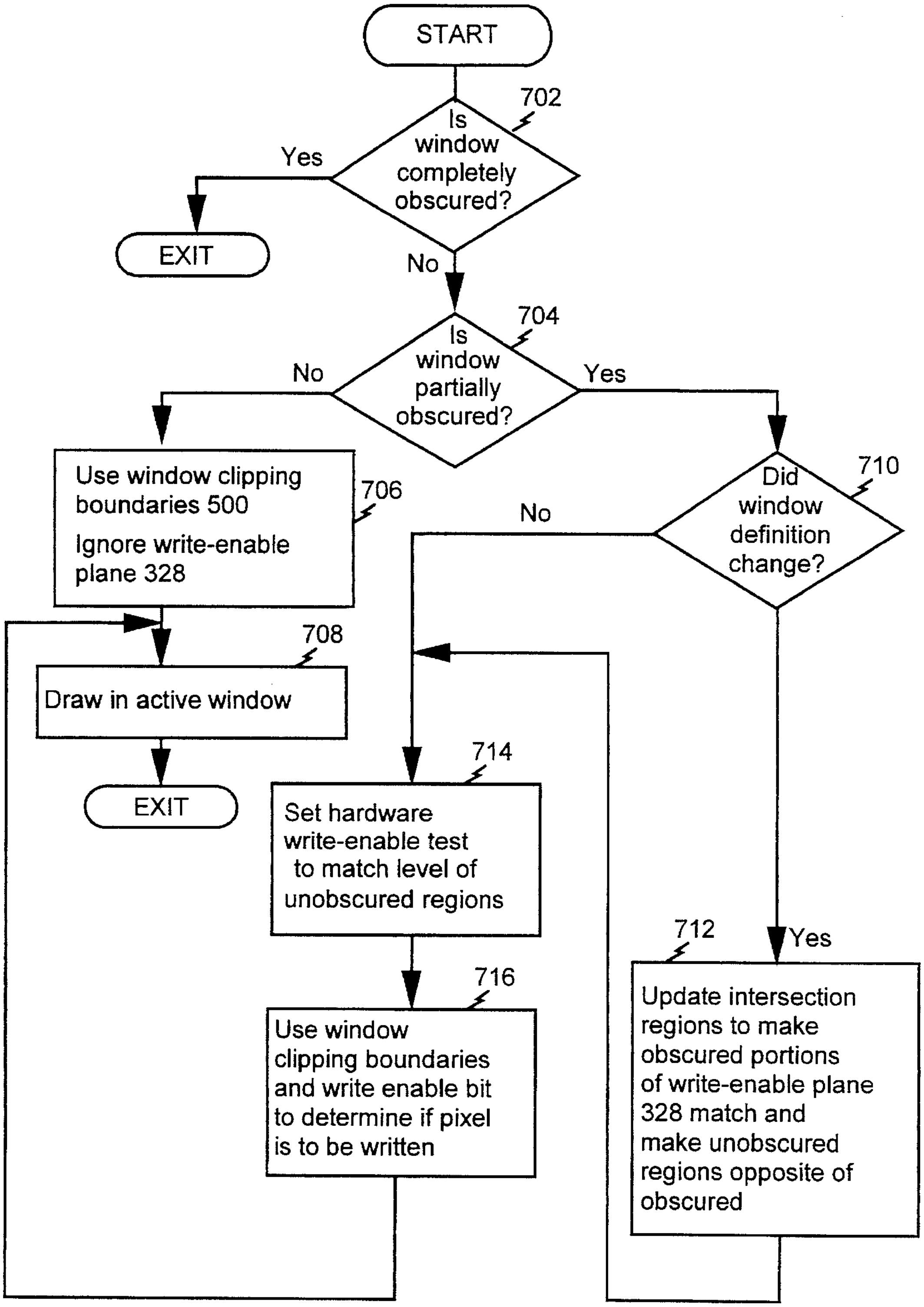
FIG. 7 is a flow chart illustrating the operation of the present invention according to a first embodiment.

FIG. 7 is a flow chart illustrating how the window system uses data structure 600 to limit writing pixels to the visible areas of the window in the frame buffer 204 in a first embodiment. In this embodiment, the test for determining whether a pixel is to be written to frame buffer 204 exists independently for each window, and is complementary for overlapping windows. For example, the test for window 402 could be defined such that the pixel is written to frame buffer 204 when the write enable bit (in write enable plane 328) is a one and the pixel is not written when the write enable bit is a zero. Using this example, for window 402, write enable plane 328 would be zeros for regions 442,444, and 446 and ones for the rest of window 402 as defined by window clipping boundary 500 for that window. At the same time, the test for window 410 would be defined such that a pixel is written to frame buffer 204 for window 410 when the write enable bit is a zero and not written when the write enable bit is a one. Thus, for window 410, all bits in write enable plane 328 corresponding to region 448 would be ones because region 448 is obscured by window 412. All the remaining bits for the write enable plane defined by window clipping boundary 500 for window 410 would be zeros indicating those pixels may be written to frame buffer 204.

Following this example further, all unobscured regions of window 402 have a write enable bit of one and all obscured regions of window 402 have a write enable bit of zero (the opposite of the unobscured regions). At the same time, all unobscured regions of window 410 have a write enable bit of zero. Thus, if graphics screen 206 or display controller 202 updates frame buffer 204 by writing to window 410 and then updates by writing to window 402 the write enable plane does not have to be updated (assuming the window definitions for window 402 did not change). This is because zeros in the portion of write enable plane 328 that corresponds to pixel locations in region 446 allowed pixels to be written to that region in frame buffer 204 on the previous operation. In the current operation these same zeros prohibit pixels of from being written to frame buffer 204 in region 446.

Turning now to FIG. 7, in a step 702, graphics screen 206 first determines whether the window in which an object is to be drawn is completely obscured. If it is obscured totally, the operation ends and all drawing operations may be discarded since the window is not visible. Drawing can be discarded in many ways, but the simplest is to not pass the data to frame buffer 204. If the window is not totally obscured the operation continues at a step 704. This determination is made using data structure 600.

In step 704, graphics server 206 uses data structure 600 to determine whether the window is partially obscured. If the window is not partially obscured in step 704 (and not completely obscured as determined in step 702), no obscurations exist for that window. This is the first case described above. In this case the operation continues at a step 706.

In step 706, because the window is unobscured, window clipping is done by simply testing the pixels for each location against window clip boundaries 500 defined for that window. If a pixel falls outside of these boundaries 500, it is not written to frame buffer 204. If it falls within those boundaries it is written without question because the window is not obscured by any other window. Thus, in this case, the write-enable plane 328 is not needed and it is disabled from restricting writing to frame buffer 204.

In a step 708, the pixels for the visible portions of the active window (in this case all portions are visible) are written to frame buffer 204 using the set of constraints defined by the previous steps.

If, however, in step 704 the window is partially obscured, the operation proceeds at a step 710. This corresponds to cases 2 and 3 described above. In step 710, graphics server 206 determines if the window definition changed since the last operation. The window definition changes when the window is deleted, re-sized, relocated, a new window is created (that intersects with the window), or the top/bottom relationship between windows (i.e., relative priorities) changes. If the window definition changed, the operation proceeds at a step 712. If the window definition did not change, the operation proceeds at a step 714. A change in the window definition results in a change to data structure 600.

In step 712, graphics server 206 updates write enable plane 328 so that the bits of the write enable plane that correspond to the unobscured portions of the windows all indicate that the pixels should be written to the frame buffer (e.g. all ones for unobscured portions of window 402 and all zeros for unobscured portions of window 404 in the example above).

In step 714, the hardware write enable test for each window is set to correspond to the convention chosen for each window. The test is set such that for unobscured regions of the window the test is true. For example, the presence of ones in write enable plane 328 within the boundaries of window 402 indicate that information for window 402 is to be written to frame buffer 204. Thus the test is true for window 402 when a one appears in write enable plane 328.

In step 716, graphics server 206 uses window clip boundaries 500 and write enable plane 328 (within window clip boundaries 500) to determine whether to write pixels to frame buffer 204. If these tests indicate a pixel is not to be written to the window because it falls within an obscured region, the pixel is optionally written to backing store 210.

In a step 708, the image is drawn into the window. In this step, pixels within the visible portions of the active window are written to frame buffer 204.

Note two important points regarding this embodiment. First, if the window is totally unobscured or totally obscured, the write enable planes are not needed. All graphics server 206 must do is write pixels for the window into the area defined by window clip boundary 500 for that window. Second, for partially obscured windows, if the window definition does not change, the write control plane does not have to be updated between operations. Because obscured and unobscured regions are defined for windows in a complementary fashion, if the display controller draws to one window, then switches to another, the write enable plane 328 remains the same. All that changes is the hardware test used to determine whether to write the pixel to frame buffer 204 (i.e., write if one vice write if zero). This saves an operation of having to update write enable plane 328.

Figure 9:
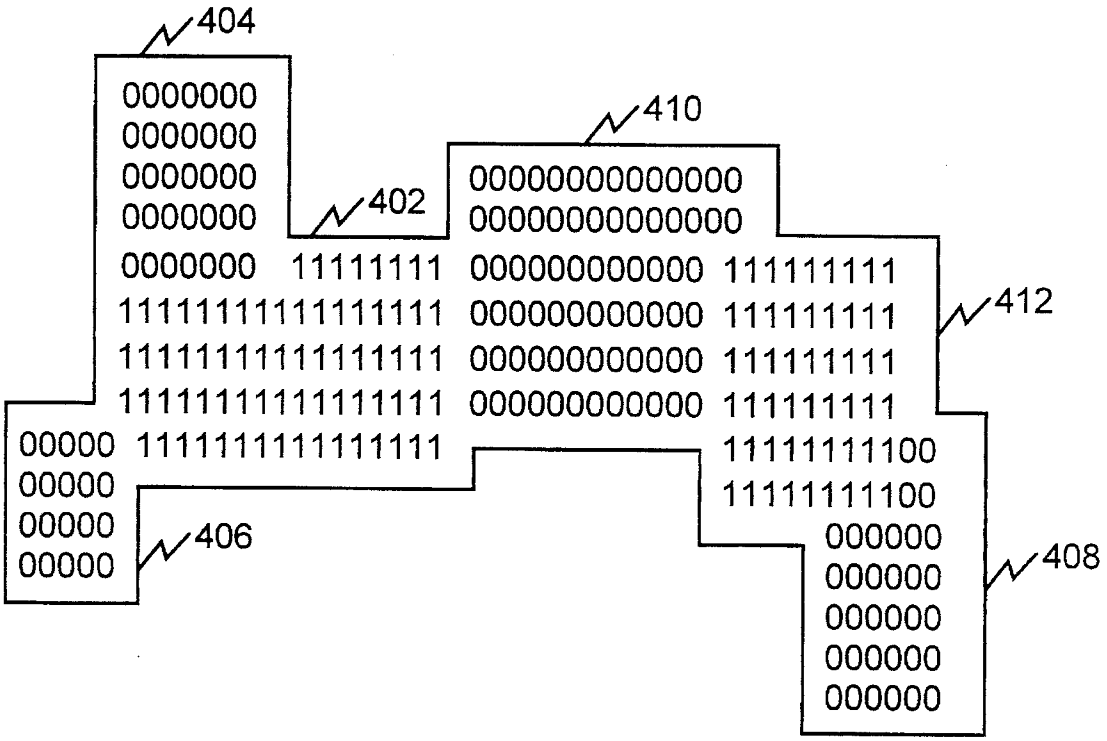
FIG. 9 is a diagram illustrating write enable bits of a write enable plane for multiple overlapping windows according to the present invention.

FIG. 9 provides an example illustration of the bits in write enable plane 328 for the windows illustrated in FIG. 4 according to the first embodiment. In window 402 ones indicate portions of the window that are unobscured while zeros indicate active portions.

In a further embodiment, the convention used by write enable plane 328 for every window is the same. For example, a one indicates unobscured regions for every window, while a zero indicates obscured regions for every window. In this further embodiment, if the display controller writes to a first window in a first operation, and wants to write to a second window in a second operation, where the windows overlap, write control plane 328 must be updated.

For example, suppose graphics server 206 writes to window 404. To enable this operation, all the bits in write enable plane 328 within window clip boundary 500 for window 404 are set to the value of one. If display controller 202 next wants to write to window 402, the bits in write enable plane 328 corresponding to region 442 (where window 404 is on top of 402) must be changed from ones (used to write in previous operation) to zeros. Thus, according to the second embodiment, step 712 must be performed regardless of whether the window definition changed.

Figure 10:
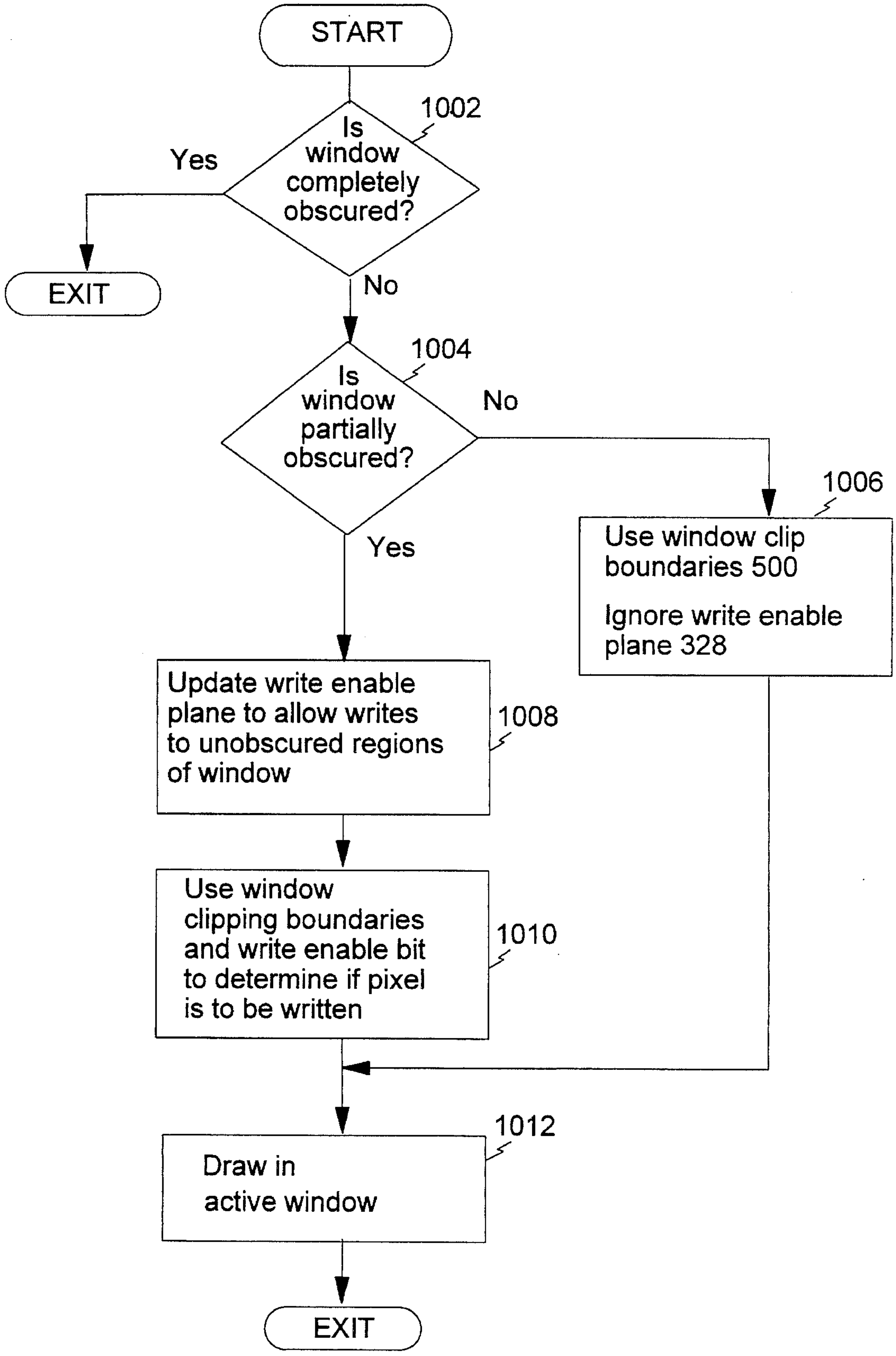
FIG. 10 is a flow chart illustrating the method of the present invention according to an alternative embodiment.

FIG. 10 is a flowchart illustrating the method according to the second embodiment of the invention. Graphics server 206 determines if a window is completely obscured in a step 1002. This determination is based on data structure 600. If the window is completely obscured, the operation ceases. Graphics server 206 determines whether the window is partially obscured in a step 1004. If the window is not partially obscured (i.e., it is totally unobscured), in a step 1006, display controller 202 uses window clip boundaries 500 to determine whether a pixel is to be written to frame buffer 204. Display controller writes the appropriate pixels to frame buffer 204 in a step 1012. These pixels fall within a visible portion of the active window.

If, on the other hand, in step 1004 the window is partially obscured, graphics server 206 updates write-enable plane 328 (step 1008) to allow writes to only unobscured regions of the window. Graphics server 206 uses this write-enable plane and the window clip boundaries to determine if a pixel is to be written to frame buffer 204 in a step 1010. Pixels within a visible portion of the active window are written to frame buffer 204 in a step 1012. Optionally, pixels within obscured regions of the window are written to backing store 210.

Figure 11:
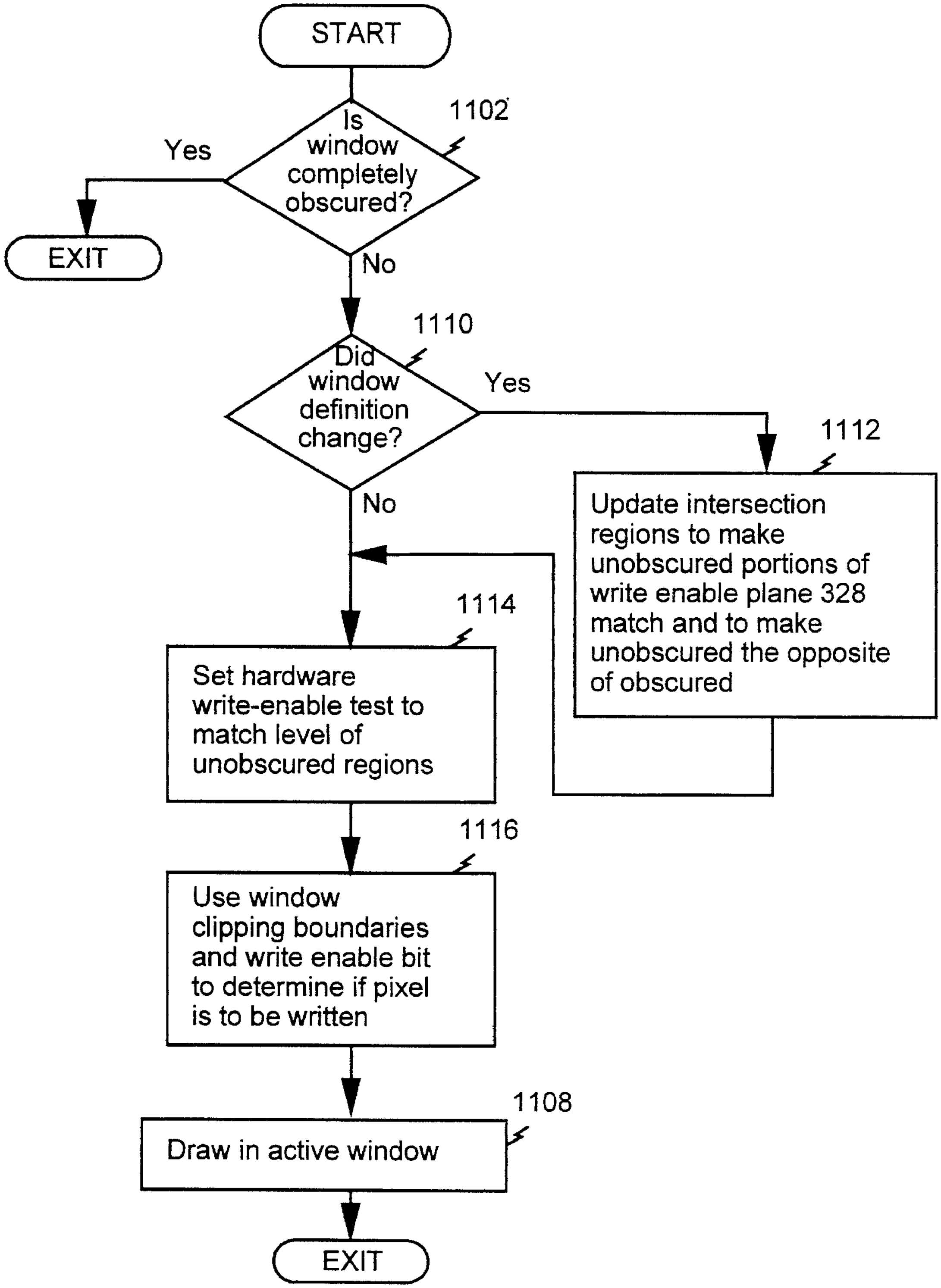
FIG. 11 is a flow chart illustrating the operation to support non-rectangular windows according to the present invention.

Write enable plane 328 according to the present invention can also be used to support windowing applications having non-rectangular windows. FIG. 11 is a flowchart illustrating the use of write-enable plane 328 to support drawing in non-rectangular windows. Because non-rectangular windows can not be completely defined by window clip boundaries 500, write enable plane 328 must always be used for drawing into non rectangular windows. Consequently, it does not matter whether the window is partially obscured (step 704 in FIG. 7). FIG. 11 is therefore a subset of FIG. 7 (i.e., without steps 704 and 706).

Referring now to FIG. 11, the operation to support non-rectangular windows will now be described. If the window is completely obscured, the operation ceases, and no pixels are written to frame buffer 204, as shown in a step 1102. If the window is not completely obscured, pixels in the unobscured regions will be written to frame buffer 204. The balance of the steps in FIG. 11 are for determining whether a pixel appears in an unobscured region of the window.

In a step 1110, graphics server 206 determines if the window definition changed. This determination is based on data structure 600. If the window definition changed since the last operation, in a step 1112 the intersection regions are updated so that the write-enable plane properly indicates which portions of the window are unobscured. In step 1114, the hardware write-enable test is set to allow writes for unobscured regions and to inhibit writes for obscured regions.

In a step 1116, the window clipping boundaries in the write-enable plane are used to determine if a pixel is to be written to frame buffer 204. In a step 1108, the pixels in visible portions of the active window are written to frame buffer 204 using the constraints established during the previous steps. Optionally obscured pixels are written to backing store 210.

Note that FIGS. 7, 10 and 11 are discussed in terms of graphics server 206 performing the operations. These operations may alternatively be performed by display controller 202.

One of ordinary skill in the art can readily see that the current invention can be extended to make use of multiple window clip boundary rectangles.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for controlling the drawing within a window in a system for displaying multiple windows, the system comprising a write enable test, and having a data structure comprising a single write-enable plane and a window data structure for storing information regarding the relative positions of the displayed windows including relative window priorities, window intersection regions and window clip boundaries information, the method comprising the steps of:

(a) checking the window data structure and determining whether the relative position of the window has changed since the previous operation;

(b) updating the single write-enable plane, using window intersection regions in the window data structure., with a complementary bit pattern so that all obscured regions of the single write-enable plane which correspond with the window are set to a first logic level and so that all unobscured regions of the single write-enable plane are set to a second logic level, wherein the single write-enable plane is updated only if the relative position of the window has changed since said previous operation;

(c) setting the write enable test true for unobscured regions of the window to be displayed; and (d) determining if a pixel is to be written to a frame buffer, based on said write enable test and on the window clip boundaries.

2. The method of claim 1, further comprising the step of writing a pixel to the frame buffer.

3. The method of claim 1, further comprising the step of determining whether a window to be drawn is completely obscured, the determination based on the window intersection region information and the relative window priority information in the window data structure.

4. The method of claim 1, further comprising the steps of:

(e) determining whether a window to be drawn is totally unobscured; and (f) drawing said window to be drawn using only the window clip boundary for that window if said window to be drawn is totally unobscured.

5. The method of claim 4, wherein said step (e) comprises the steps of:

(i) determining whether said window to be drawn is completely obscured; and (ii) determining whether said window to be drawn is partially obscured.

6. A system for controlling the drawing of a window in a system for displaying multiple windows, the system comprising a write enable test, and having a data structure comprising a single write-enable plane and a window data structure for storing information regarding the relative positions of the displayed windows including relative window priorities, window intersection regions and window clip boundaries information, the system comprising:

means for checking the window data structure and determining whether the relative position of the window has changed since a previous operation;

means for updating the single write-enable plane, using window intersection regions in the window data structure, with a complementary bit pattern so that all obscured regions of the single write-enable plane which correspond with the window are set to a first logic level and so that all unobscured regions of the single write-enable plane are set to a second logic level, wherein the single write-enable plane is updated only if the relative position of the window has changed since said previous operation;

means for setting the write enable test true for unobscured regions of the window to be displayed; and means for determining if a pixel is to be written to a frame buffer, based on said write enable test and on the window clip boundary.

7. The system of claim 6, further comprising means for determining whether a window to be drawn is completely obscured, the determination based on the intersection region information and window priority information in the window data structure.

8. The system of claim 6, further comprising:

means for determining whether a window to be drawn is totally unobscured; and means for drawing said window to be drawn using only the window clip boundary for that window if said window to be drawn is totally unobscured.

9. The system of claim 6, wherein said means for determining comprises:

means for determining whether said window to be drawn is completely obscured; and means for determining whether said window to be drawn is partially obscured.

10. The system of claim 6, further comprising:

means for determining whether a window to be drawn is non-rectangular; and means for drawing said window to be drawn using the window clip boundary information for that window and the single write-enable plane, if said window to be drawn is non-rectangular.

11. An apparatus for controlling pixel writes in a system for displaying multiple windows, comprising:

frame buffer means for storing a pixmap of a window for display, said frame buffer means comprising a single write-enable plane configured to indicate whether a pixel is within a window boundary of said window and whether said pixel is obscured by another window, wherein said single write-enable plane indicate whether said pixel is to be written to said frame buffer means by using a complementary bit pattern and said single write-enable plane is updated by said frame buffer means only when the relative position of said window has changed since a previous display operation; and.

graphics controller means, electronically coupled to said frame buffer means, for determining whether a pixel is to be written to said frame buffer means, wherein said determination is made based on said single write-enable plane and window clip boundary data.

12. The apparatus of claim 11, further comprising memory means, coupled to said graphics controller means, for storing information in a window data structure regarding the relative positions of the displayed windows, wherein said window data structure comprises said window clip boundary data, window priority data, window intersection data, and intersection region structure data.

13. The system of claim 11, further comprising:

means for determining whether a window to be drawn is totally unobscured; and means for drawing said window to be drawn using only said window clip boundary data for that window if said window to be drawn is totally unobscured.

14. The system of claim 11, wherein said means for determining comprises:

means for determining whether said window to be drawn is completely obscured; and means for determining whether said window to be drawn is partially obscured.

15. The system of claim 11, further comprising:

means for determining whether a window to be drawn is non-rectangular; and means for drawing said window to be drawn using said window clip boundary data for that window and said single write-enable plane, if said window to be drawn is non-rectangular.

16. The apparatus of claim 11, wherein said frame buffer means further comprises:

a first frame buffer and a second frame buffer for double buffering said pixmap; and a front/back buffer select plane for selecting whether a pixel is written to said frame buffer means.

17. The apparatus of claim 11, wherein said frame buffer means further comprises at least one video mode select plane to indicate a video mode.

18. The apparatus of claim 11, further comprising a backing store for storing at least one pixel that falls within an obscured region of a displayed window.

19. The apparatus of claim 11, wherein said frame buffer means further comprises a write-once plane to indicate whether a pixel is to be written only once per object.

* * * * *